(12) United States Patent
Lagerwey

(10) Patent No.: US 6,774,504 B1
(45) Date of Patent: Aug. 10, 2004

(54) WIND POWER GENERATOR

(75) Inventor: Hendrik Lambertus Lagerwey, Kootwijkerbroek (NL)

(73) Assignee: Zephyros B.V., Barneveld (NL)

( * ) Notice: Subject to any disclaimer, the term of this patent is extended or adjusted under 35 U.S.C. 154(b) by 0 days.

(21) Appl. No.: 10/088,941

(22) PCT Filed: Sep. 25, 2000

(86) PCT No.: PCT/NL00/00686

§ 371 (c)(1),
(2), (4) Date: Mar. 21, 2002

(87) PCT Pub. No.: WO01/21956

PCT Pub. Date: Mar. 29, 2001

(30) Foreign Application Priority Data

Sep. 24, 1999 (NL) .............................. 1013129

(51) Int. Cl.$^7$ ................................. F03D 9/00
(52) U.S. Cl. ............................. 290/44; 290/5
(58) Field of Search ....................... 290/44, 5

(56) References Cited

U.S. PATENT DOCUMENTS

| | | | |
|---|---|---|---|
| 4,421,967 A | * 12/1983 | Birgel et al. | ............... 219/10.5 |
| 5,617,649 A | * 4/1997 | Joo | .............................. 34/315 |
| 5,670,838 A | 9/1997 | Everton | ....................... 310/254 |

FOREIGN PATENT DOCUMENTS

DE        44 02 184        8/1995

OTHER PUBLICATIONS

Patent Abstracts of Japan, vol. 2000, No. 01, Jan,. 31, 2000 & JP 11 299197A, Oct. 29, 1999 abstract; figures 1,2 (to follow).

* cited by examiner

*Primary Examiner*—Nicholas Ponomarenko
*Assistant Examiner*—Iraj A. Mohandesi
(74) *Attorney, Agent, or Firm*—St. Onge Steward Johnston & Reens LLC

(57) ABSTRACT

A windmill driven electric generator is described with an air sealed closed chamber surrounding rotating and stationary parts to prevent condensation problems during times when the windmill is standing still due to a lack of wind. The closed chamber may be provided with a super atmospheric pressure to avoid entry of moisture-laden air. An air drier is used to maintain the closed chamber air dry and at a temperature that is below the dew point. Various embodiments are described.

8 Claims, 6 Drawing Sheets

WIND POWER GENERATOR

The invention relates to a windmill according to the preamble of claim 1. A windmill of this type is known from DE 4402184. In the known device, it is possible that moisture may be deposited on the windings of the generator while the windmill is at a standstill. In this case, before the windmill can be started up, the stator has to be heated in order to expel the moisture, since otherwise a short circuit may occur in the windings of the stator. This heating takes up considerable time, which consequently has an adverse effect on the time for which the windmill can be used to good effect. To avoid this drawback, the device is designed in accordance with the preamble of claim 1. This prevents moist air from being fed into the chamber around the stator, thus avoiding the deposition of moisture.

According to a refinement, the invention is designed in accordance with claim 2. This further reduces the risk of condensation on the stator.

According to a refinement, the device is designed in accordance with claim 3. This prevents moist air from being fed into the closed chamber.

According to a refinement, the device is designed in accordance with claim 4. As a result, the air is dried only when there is a risk of condensation, so that the wear to the air dryer is limited.

According to a refinement, the device is designed in accordance with claim 5. This ensures that the stator is at a uniform temperature all the way around and there is no possibility of local condensation. The stator is also prevented from becoming unround, so that the air gap can be kept smaller.

According to one embodiment, the windmill is designed in according with claim 6. As a result, it is impossible for any air to be supplied or discharged along the bearing and, if appropriate, a superatmospheric pressure may be applied in the closed chamber.

According to one embodiment, the windmill is designed in accordance with claim 7. This makes it easier to check the presence of lubricant in the bearing, so that there is no damage caused to the seals as a result of absence of lubricant.

According to a refinement, the device is designed in accordance with claim 8. As a result, it is easily possible to check on an ongoing basis that the bearing and the seals are being lubricated correctly and, if necessary, to institute appropriate measures.

Figure 1:
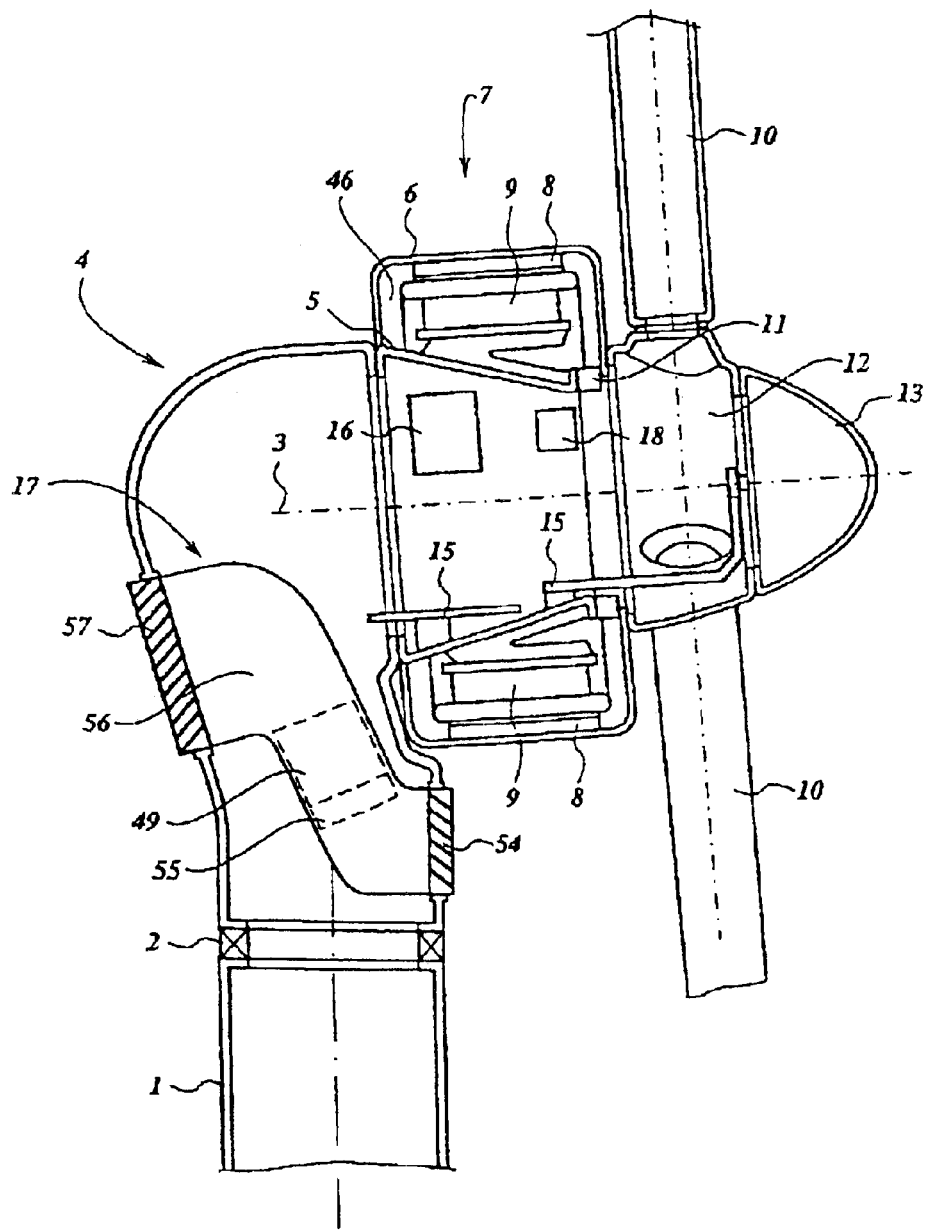
Figure 2:
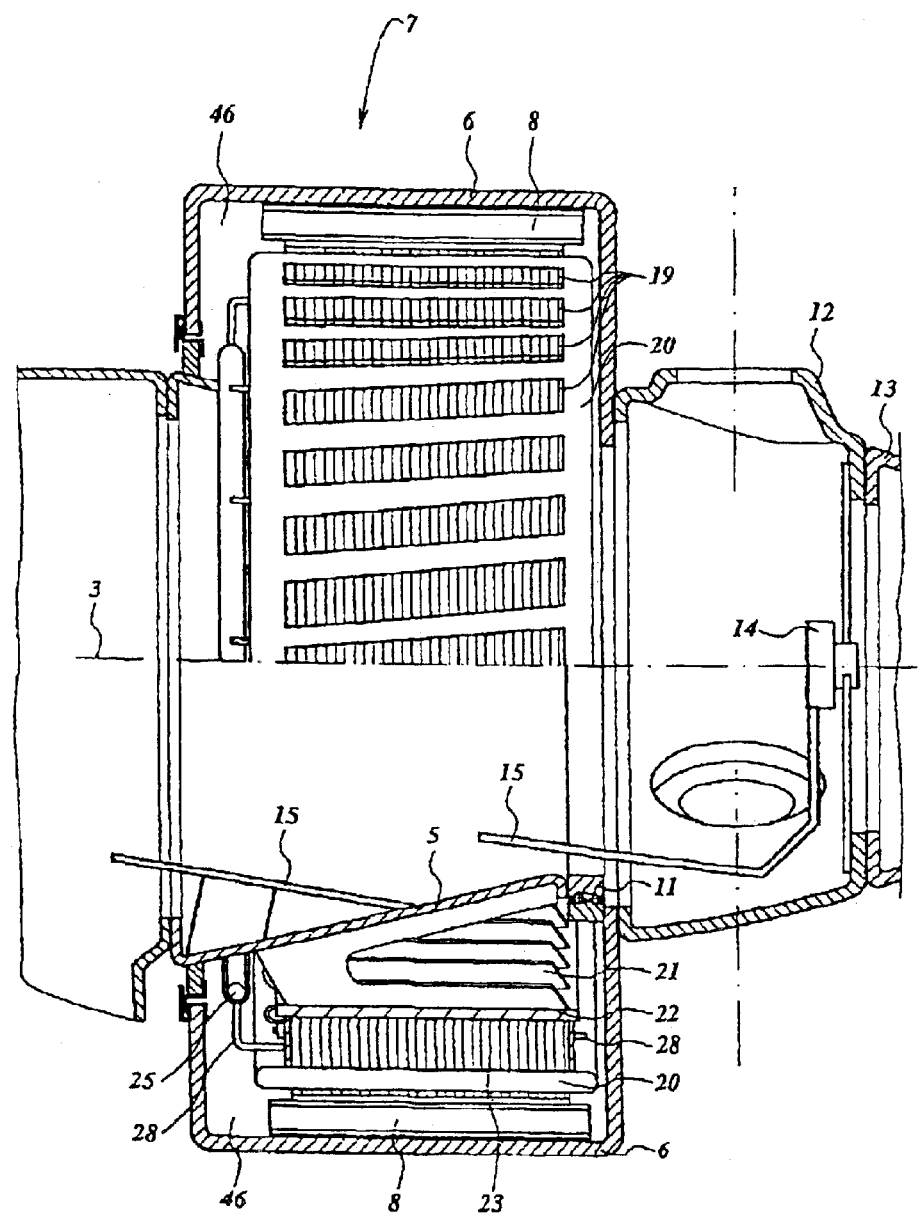
Figure 3:
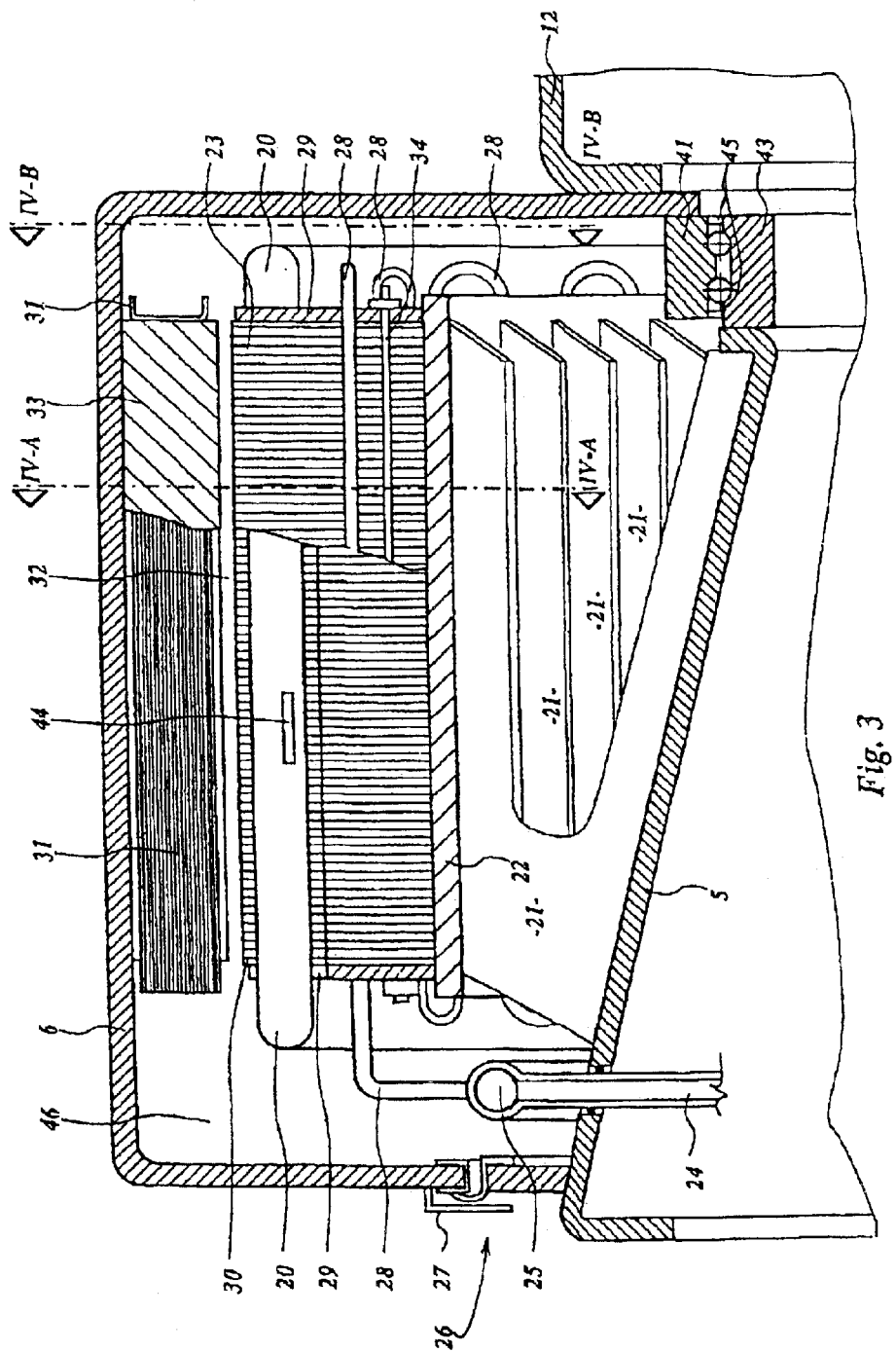
Figure 4:
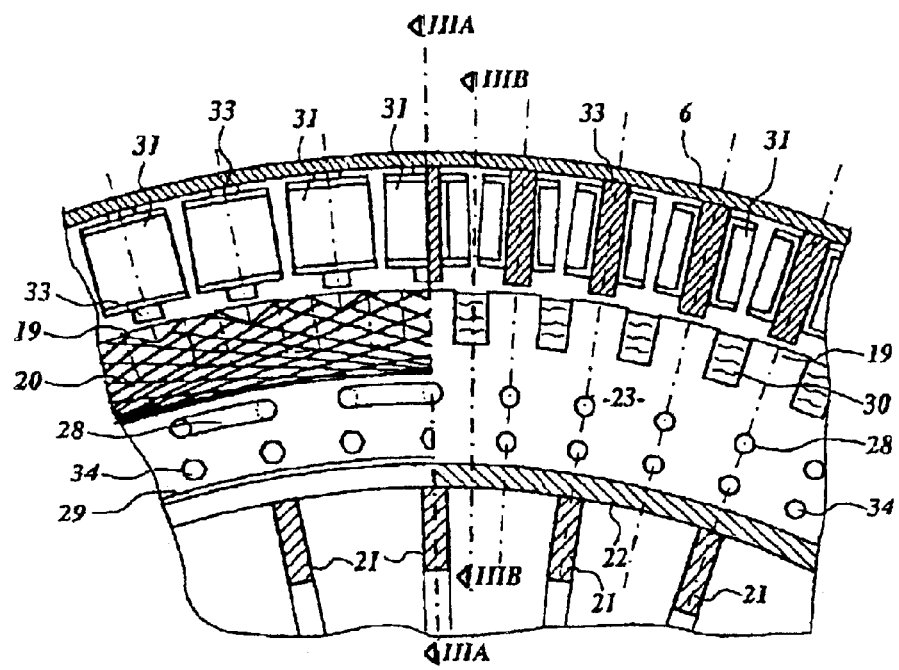
Figure 5:
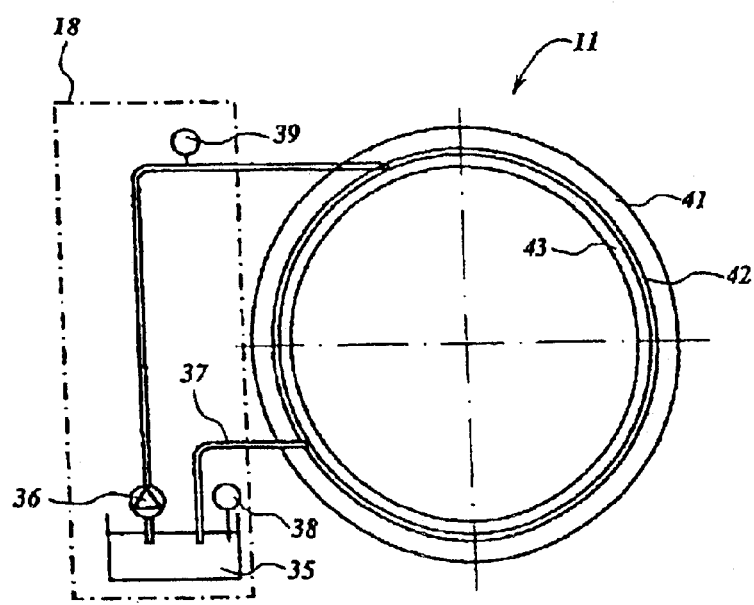
Figure 6:
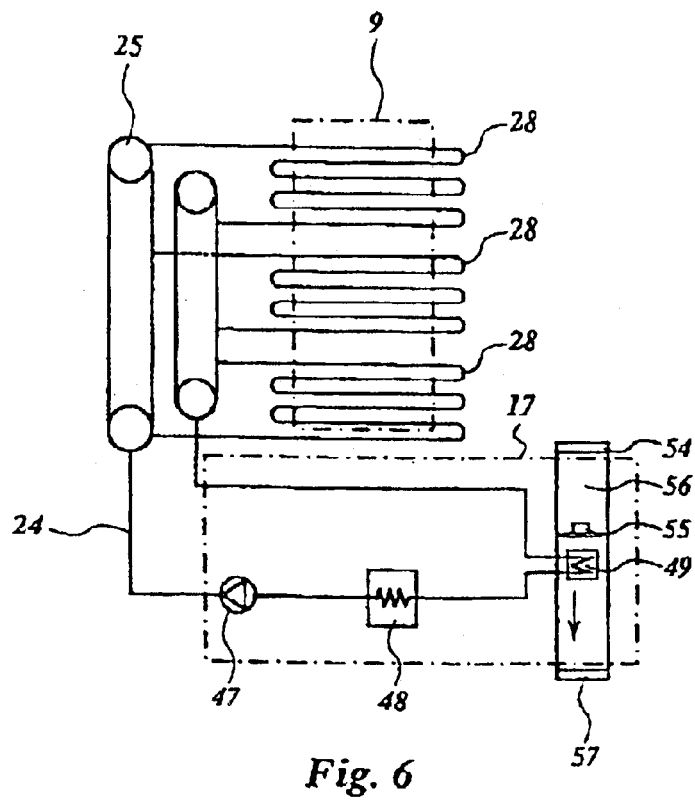
Figure 7:
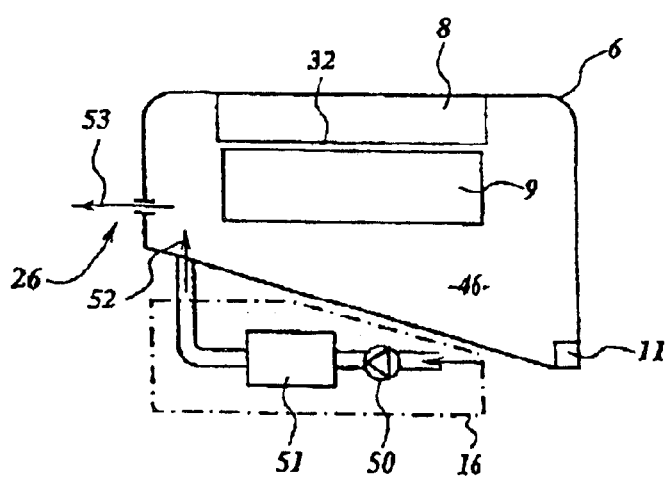
Figure 8:
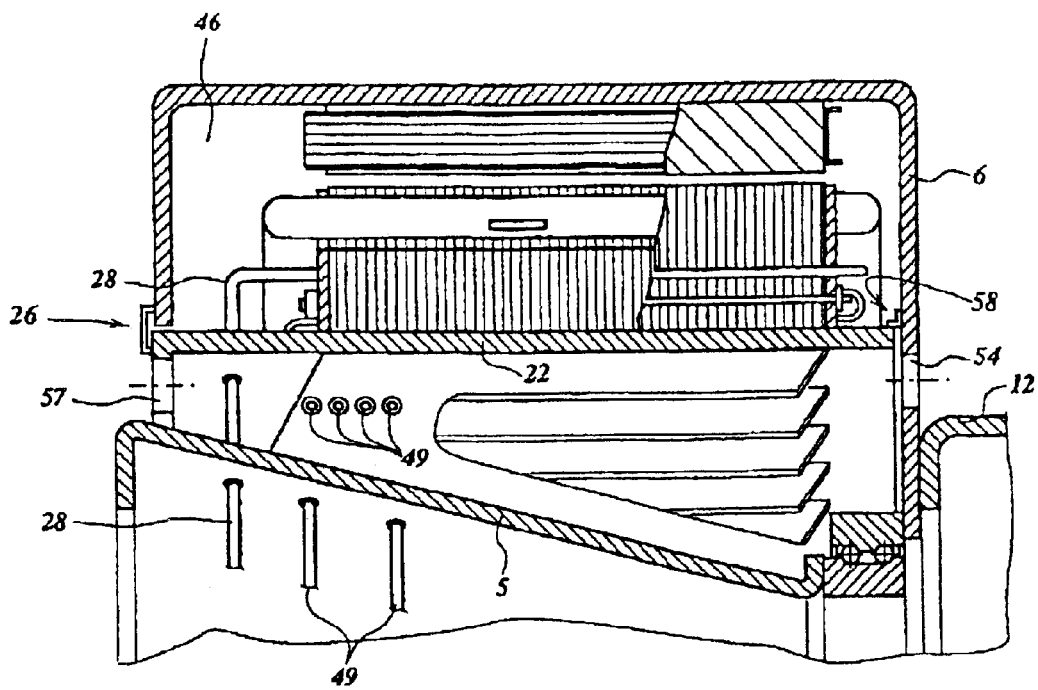
Figure 9:
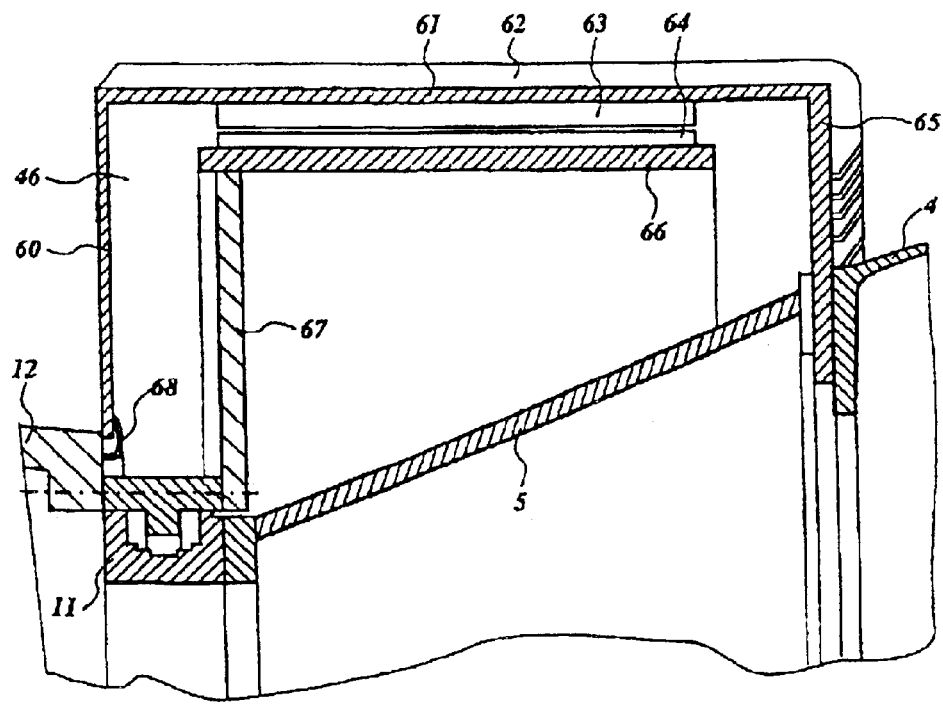

The invention is explained below with reference to an exemplary embodiment and with the aid of a drawing, in which:

FIG. 1 shows a diagrammatic cross section through a windmill,

FIG. 2 shows a cross section and partial view of a part of the windmill shown in FIG. 1, FIG. 3 shows a cross section through the generator of the windmill shown in FIG. 1, FIG. 4 shows a longitudinal section through the a generator of the windmill shown in FIG. 1, FIG. 5 diagrammatically depicts the lubrication unit of the bearing of the windmill shown in FIG. 1, FIG. 6 diagrammatically depicts the cooling unit of the generator of the windmill shown in FIG. 1, FIG. 7 diagrammatically depicts the supply of air to the generator chamber of the windmill shown in FIG. 1, FIG. 8 shows a second embodiment of the air channel of the cooling unit, and FIG. 9 shows a second embodiment of the generator of the windmill shown in FIG. 1.

FIG. 1 shows a cross section through a machine housing 4 of a windmill. The machine housing 4 is positioned on a mast 1 by means of a bearing 2. The machine housing 4 comprises a generator 7 which is mounted around a conical bush 5. On the conical bush 5 are mounted a stator 9 and a main bearing 11 which can rotate about an axis of rotation 3. A rotor 8, which is arranged on the outside of the stator 9, is attached to the rotating part of the main bearing 11. The outer circumference of the generator 7 is covered by a generator cap 6 which rotates with the rotor 8, thus forming a generator chamber 46.

A vane support 12, to which three vanes 10 are attached, is likewise attached to the rotating part of the main bearing 11, which vanes 10 are provided with a vane adjustment mechanism (not shown). To provide current to the rotor 8 and the vane adjustment mechanisms, there is a slip ring holder 14 with slip rings. The front side of the vane support 12 is protected by a nose cap 13.

A platform 15 is arranged inside the machine housing 4 at the location of the conical bush 5, for operating staff. The machine housing 4 also accommodates an air unit 16, a cooling unit 17 and a lubrication unit 18. The air unit 16 is responsible for feeding air to the generator chamber 46, this air preferably being dried in order to prevent moisture from reaching the windings of the generator 7.

In a manner which is to be indicated in more detail, the cooling unit 17 ensures that cooling liquid is circulated through the stator 9 of the generator, with the result that heat is dissipated from the generator 7. Considerable amounts of heat are developed in the stator 9 of the generator, which heat has to be dissipated immediately To this end, the cooling unit 17 accommodates a heat exchanger 49 which is held in an air channel 56. The air channel 56 runs from a cooling-air inlet 54, which is arranged on the windward side of the machine housing 4, to a cooling-air outlet 57, which is positioned on the leeward side of the machine housing 4. The air channel 56 is a more or less closed channel, so that the cooling air, which may be salty and moist, does not enter the machine housing 4. If appropriate, the air channel 56 accommodates a fan 55, so that the dimensions of the air channel 56 and the heat exchanger 49 can be kept smaller while retaining the same cooling capacity. If appropriate, heat can be fed to the circulating cooling liquid during or after a prolonged standstill period, for example, as a result of the absence of wind, in order to keep warm or heat the windings of the stator 9, so that condensation is not formed or, disappears.

The lubrication unit 18 ensures that the main bearing 11 is suitably lubricated. Moreover, the machine housing 4 contains various control and safety units which are not described in more detail, for example for controlling the adjustment of the vanes and for controlling the abovementioned units. Additionally, there is a brake (not shown) and, if appropriate, a blocking pin for stopping movement of the vanes 10 of the windmill during maintenance work.

In the exemplary embodiment of the windmill which is shown, the mast 1 is approximately 70 metres high and has a diameter of 2 metres. The diameter of the vanes 10 is 70 metres, the diameter of the main bearing 11 is approximately 1800 millimetres and the diameter of the generator is 3800 millimetres. The rated output generated by the generator 9 is 1500 kilowatts at a rotational speed of the rotor of 18 revolutions per minute and 2000 kilowatts at 24 revolutions per minute.

FIG. 2 shows the generator 7. The bottom half of the figure shows the stator 9 in cross section. A support ring 22 with support plates 21 is secured around the conical bush 5. A stator core 23, which is composed in a known way of plates of soft iron, is secured around the support ring 22. In the outer circumference of the stator core 23, there are winding slots 30 between stator poles 19, cf. FIG. 1, through which the windings of a stator coil 20 run. The top half of the figure shows a view of the outside of the stator coil 20, from which it can be seen that the stator poles 19 form an angle of approximately 5degrees with the axis of rotation 3. On account of this angle, the stator poles 19 also form an angle with the magnets of the rotor 8 which are positioned parallel to the axis of rotation 3. This results in the generator running quietly.

FIGS. 3 and 4 show a more detailed view of the generator 7, FIG. 3 showing the cross sections IIIA and IIIB from FIG. 4, and FIG. 4 showing the cross section IVA and the view IVB from FIG. 3. The stator core 23 is arranged around the support ring 22, the stator core 23 being provided with stator poles 19 and winding slots 30 between them. The windings running through the winding slots 30 together form the stator coil 20. The stator core 23 is composed of plates which are clamped between clamping plates 29 by tension rods 34. Cooling lines 29 run through the stator core 23, and are connected to an inlet line 24 and an outlet line via a manifold.

Magnet cores 33 are attached to the generator cap 6 in a known way. Around each magnet core 33 there is a coil 31 which, during use, is energised in a known way by a field current, so that when the rotor 8 rotates, changing magnetic fields are generated in an air gap 32 between the stator poles 19 and the magnet cores 33, with the result that electric voltage and an electric current is generated in the stator coil 20. Partly as a result of the electric current generated in the windings, heat is developed in the stator 9, and this heat has to be dissipated. The temperature in the windings is measured using a temperature sensor 44. If the temperature is too high, for example if it reaches above 40° Celsius, the cooling unit 17 is switched on. The cooling unit 17 is provided, for example, with a controller for keeping the temperature of the stator at a constant level. As a result, the temperature of the stator coil 20 remains low, with the result that the resistance in the wires of the windings does not increase and there is no adverse effect on the efficiency. The heat which is generated in the rotating magnet coils 31 and the magnet core 33 is dissipated via the magnet core 33 to the generator cap 6 and, from there, to atmosphere. Partly as a result of the temperature in the stator 9 being held at 40° Celsius, the temperature of the space enclosed by the stator also does not become any warmer, and the temperature of the equipment inside the machine housing 4 and of the main bearing 11 remains sufficiently low, so that there is no need to provide any additional cooling for these components.

Once the wind has stopped, there is a risk of moisture condensing on the windings of the stator coil 20. When the generator is started up, a high voltage is applied to the stator coil 20, and there is then a risk of short-circuiting in the windings, causing a fault in the installation To reduce this risk, the deposition of moisture is prevented or moisture which has been deposited is expelled by heating as a result of the stator coil 20 being heated before it is started up. This heating may use special windings in the coil, which function as electric heater means. Another embodiment is for the stator coil 20 to be heated using the liquid in the cooling line 28. As a result of the stator coil 20 being heated uniformly all the way around, there is no possibility of local cold spots at which condensation may form.

The rotor has coils 31 which are easy to heat electrically as a result of current being passed through the coils 31, generation of current in the stator 9 being prevented by, for example, energizing the coils 31 with AC current.

An additional advantage of the uniform heating of the stator 9 and of the stator 9 being held at a constant temperature is that it maintains the same temperature all the way around and therefore expands uniformly and to a limited extent all the way around as a result of the temperature being controlled within tight limits. As a result, the air gap 32 will remain the same all the way around and does not become too small in certain areas through local expansion. As a result, the air gap 32 can be kept small, which has a beneficial effect on the efficiency of the generator 7.

The risk of condensation on the stator coil 20 is reduced further by ensuring that the generator chamber 46 contains only dry air, which is useful in particular if the windmill is positioned, for example, near or in the sea. For this purpose, the main bearing 11 is provided in a known way with seals 45, and a seal 26 is positioned between the rotating generator cap 6 and the stationary conical ring 5, and all other openings in the generator chamber 46 are sealed. The seal 26 is provided with a dust cap 27, so that the rubber of the seal is protected from the effects of sun and other influences from the weather. To prevent air from being drawn into generator chamber 46 from the outside in the event of temperature changes, the air unit 16 provides a possibly limited superatmospheric pressure in the generator chamber 46 by supplying air from the machine housing 4, which air is as dry as possible and is preferably dried even further using an air dryer. If appropriate, the air unit 16 is designed in such a manner that air is sucked out of the generator chamber 46. This air is then mixed in the air unit 16 with a limited amount of air from the outside or from out of the machine housing 4 and is then dried and returned to the generator chamber 46. If appropriate, the air unit 16 is provided with switching means, so that the air unit is only switched on when the windmill is at a standstill. Since the stator is sufficiently warm while the windmill is operating, there is then no risk of condensation, and consequently wear to the air unit is reduced. It is also possible for sensors (not shown) to be arranged in the generator chamber 46, which can be used to measure the dew point of the air. If the air approaches the dew point, for example as a result of cooling, the air unit 16 switches on, so that condensation is prevented.

The exemplary embodiment describes a generator 7 in which the air gap 32 is a round cylinder. It is also possible in a similar way to make a generator in which the air gap 32 is conical, so that the generator 7 better follows the shape of the conical bush 5, and, if appropriate, weight may be saved. The generator 7 illustrated is designed with forty-eight stator poles 19 and forty-eight magnet coils 31. Naturally, the generator may also be designed differently, for example with permanent magnets instead of the rotor 8 shown here, in which case features may be provided in the form of, for example, a displaceable stainless steel bush for interrupting the magnetic field lines when the windmill is switched off.

For the windmill to operate without problems, it is important that the main bearing 11 should be continuously provided with lubricant. For this purpose, a lubrication unit 18 is available, the action of which is shown in FIG. 5. The main bearing 11 has an outer ring 41, an inner ring 43, a race 42 and seals 45 (cf. FIG. 3). In the top of the main bearing 11, a feed line 40 opens out into the race 42, and half-way between the bottom and the centre of the main bearing 11 there is a return line 37 connected to the race 42. A pump 36 is used to pump oil out of a buffer vessel 35 into the feed line 40, a pressure and/or flow rate sensor 39 being used to monitor whether oil is being pumped. Oil which has been pumped into the race 42 flows back into the buffer vessel 35. If insufficient oil returns to the buffer vessel 35, for example as a result of a leak in the seal 45, the level falls. This is signalled using a level sensor 36, so that maintenance can be carried out in good time. The main bearing 11 in the meantime retains sufficient oil because there is still oil in the bottom of the race 42. If appropriate, a sensor is arranged in the bearing, which detects when the bearing warms up, after which the windmill is stopped.

FIG. 6 diagrammatically depicts the system for controlling the temperature of the stator 9, known components of a circulation system of this type, including a liquid reservoir, sensors, thermostatic valves, shut-off valves and other control means not being shown in this figure. Since this system is essential for the generation of electricity, where necessary the various components are in duplicate, so that the windmill is prevented from shutting down if a component fails. By means of a circulation pump 47, liquid is pumped through the feed line 24 and the manifold 25 to the cooling lines 28. The liquid emerging from the stator 9 is passed into a hear exchanger 49 where it is cooled by air circulation. The heat exchanger 49 is positioned in the closed air channel 56 through which outside air can flow. The flow of the outside air through the heat exchanger 49 takes place as a result of the wind which blows on to the cooling air outlet 54, if appropriate with the assistance of thermal circulation as a result of heated air rising towards the cooling air outlet 57, which is at a higher level than the cooling air inlet 54. If appropriate, the air channel 56 contains a fan which, for example, is switched on when additional cooling is required. The heat exchanger 49, may for example, also be designed as part of the wall of the machine housing 4, the heat being dissipated by air which flows along the outside. If appropriate, the circulating liquid is heated in a heater arrangement 49, so that the stator 9 can be heated. To provide reliable operation, the circulation pump 47 and the heat exchanger 49 may be provided in duplicate.

The air channel 56 may also be designed differently, as shown in FIG. 8. In this case, the air channel 56 is formed by the conical bush 5 and the support ring 22, which is then widened to as far as the front and rear sides of the generator cap 6. In this there is a seal 26 on the rear side and a similar seal 58 on the front side, so that the generator chamber 46 remains closed. Therefore, the heat exchanger 49 is positioned in the space between the conical bush 5 and the support ring 22. On the front side, the generator cap 6 is provided with cooling air inlets 54 and on the rear side there are openings as cooling air outlets 57. Means which are not shown are also provided for discharging the rain which blows into the chamber.

FIG. 7 diagrammatically depicts the way in which the means for maintaining a superatmospheric pressure in the generator chamber 46 operates. The generator chamber 46 is more or less airtight and air which is blown in by means of a fan 50 via an air inlet 52 can only emerge via an air outlet 53, which air outlet 53 is situated, for example, at the location of the seal 26. It is preferable to use an air dryer 51, so that the moisture content of the air in the generator chamber 46 remains low. In another embodiment, the air unit 16 is designed in such a manner that the amount of air present in the generator chamber 46 is sucked in by the fan 50 at the same time as a small amount of outside air which is required in order to maintain a superatmospheric pressure in the generator chamber 46. The air which has been sucked in is dried in the air dryer 51 and is introduced into the generator chamber 46.

FIG. 9 shows a second embodiment of the generator of the windmill shown in FIG. 1. In this case too, the main bearing 11 is coupled to the machine housing 4 by the conical bush 5. The vane support 12 is coupled to the outer ring of the main bearing 11. In this embodiment, the generator is designed with the rotor inside the stator. A rotor support ring 67 is attached to the outer ring of the main bearing 11. A generator inner ring. 66 is secured around the rotor support ring 67. Rotor poles 64 are attached to the generator inner ring 66. The rotor poles 64 are in this case designed as permanent magnets. At the location where the conical bush 5 is attached to the machine housing 4, a generator rear wall 65 is also attached to the machine housing 4. The generator rear wall 65 supports a generator outer ring 61. On the front side, the generator outer ring 61 is provided with a generator front wall 60 which adjoins the vane support 12. A seal 68 is positioned between the stationary generator front wall 60 and the rotating vane support 12. The generator front wall 60, the generator outer ring 61 and the generator rear wall 65, together with the conical bush 5, form a closed chamber, the generator chamber 46. The seal 6B is designed in such a manner that it is impossible for any outside air to enter, so that the air in the generator chamber 46 can be dried in the manner described above and can be kept at a slight superatmospheric pressure. The seal 68 is accessible from the generator chamber 46, so that it is easy to carry out maintenance work thereon.

Stator poles 63 are arranged on the inside of the generator outer ring 61. To dissipate the heat generated in the generator poles 63, cooling ribs 62 are arranged on the outside of the generator outer ring 61. To ensure that the stator poles 63 are at the same temperature all the way around, the stator poles 63 are provided with a liquid circulation system, in the manner described above. This liquid circulation system may be permanently switched on or may be switched on only when temperature differences between the stator poles 63 are measured. This prevents the stator from reaching a temperature which is not uniform all the way around, for example as a result of insolation or as a result of differences in the dissipation of heat via the cooling ribs 62, which are caused by differences in flow around the machine housing 4.

What is claimed is:

1. Windmill for generating electric current with the aid of a generator which is driven by vanes and is provided with a rotor, a stator and a bearing on which the vanes are also mounted, comprising:

a closed chamber with at least one air seal between rotating parts and stationary parts of the generator and with the stator mounted within the closed chamber characterized in that the closed chamber wherein the means for supplying dried air provides a superatmospheric air pressure in the closed chamber.

2. Windmill according to claim 1, characterized in that the closed chamber is provided with means for supplying drying air into the closed chamber.

3. Windmill according to claim 2, and further comprising switching means for switching on the means for supplying drying air while the windmill is at a standstill.

4. Windmill according to claim 1, and further comprising means for keeping the stator at more or less the same temperature.

5. Windmill according to claim 1, characterized in that the bearing has air seals for providing an air-tight seal for the closed chamber.

6. Windmill according to claim 5, characterized in that the bearing is provided with a lubricant inlet and with a lubricant outlet having channels which are arranged in such a manner that lubricant flows out of the bearing when at least a desired amount of lubricant is present in the bearing characterized in that the bearing has air seals for providing an air-tight seal for the closed chamber.

7. Windmill according to claim 6, and further comprising means for monitoring the circulation of lubricant to the bearing and/or for detecting a return flow of lubricant out of the bearing.

8. The windmill according to claim 5, wherein the seals are selected so as to be capable of sealing in a superatmospheric pressure inside the closed chamber.

* * * * *